US008671693B2

(12) United States Patent
Straza

(10) Patent No.: US 8,671,693 B2
(45) Date of Patent: Mar. 18, 2014

(54) THERMALLY CONDUCTIVE STRUCTURE

(75) Inventor: George C. P. Straza, Imperial Beach, CA (US)

(73) Assignee: George C. P. Straza, San Diego, CA (US)

( * ) Notice: Subject to any disclaimer, the term of this patent is extended or adjusted under 35 U.S.C. 154(b) by 1286 days.

(21) Appl. No.: 12/191,208

(22) Filed: Aug. 13, 2008

(65) Prior Publication Data

US 2009/0178410 A1 Jul. 16, 2009

Related U.S. Application Data

(60) Provisional application No. 61/020,688, filed on Jan. 11, 2008.

(51) Int. Cl.
*F02K 1/00* (2006.01)

(52) U.S. Cl.
USPC ................ 60/770; 60/771; 60/262; 60/226.1; 60/226.2; 60/226.3; 239/265.11; 239/265.19; 239/265.39; 239/265.37; 239/265.43

(58) Field of Classification Search
USPC .......... 60/770, 226.1, 262, 771, 226.2, 226.3; 239/265.39, 265.11, 265.19, 265.37, 239/265.43
See application file for complete search history.

(56) References Cited

U.S. PATENT DOCUMENTS

| 3,679,384 | A | 7/1972 | Colson et al. |
| 3,887,739 | A | 6/1975 | Kromrey |
| 3,991,245 | A | 11/1976 | Jackson |
| 4,247,583 | A | 1/1981 | Roy |
| 4,381,815 | A | 5/1983 | Frost et al. |
| 5,498,462 | A * | 3/1996 | Darfler .......................... 428/116 |
| 6,051,302 | A * | 4/2000 | Moore .......................... 428/116 |
| 6,886,327 | B1 * | 5/2005 | Nathal et al. ................. 60/200.1 |
| 7,926,258 | B1 * | 4/2011 | Burton et al. ................... 60/202 |
| 7,926,285 | B2 * | 4/2011 | Tisdale et al. ................... 60/770 |
| 2005/0229585 | A1 * | 10/2005 | Webster ....................... 60/226.1 |
| 2010/0192590 | A1 * | 8/2010 | Johnson et al. ................. 60/770 |

FOREIGN PATENT DOCUMENTS

| GB | 1 532 112 | 11/1978 |
| JP | 63-172639 | 7/1988 |
| JP | 8-501254 | 2/1996 |

(Continued)

OTHER PUBLICATIONS

International Search Report and Written Opinion for PCT/US2009/030659, mailed Aug. 18, 2009, 8 pages.

(Continued)

*Primary Examiner* — Phutthiwat Wongwian
*Assistant Examiner* — Craig Kim
(74) *Attorney, Agent, or Firm* — Morrison & Foerster LLP

(57) ABSTRACT

A multi-layered honeycomb structure adapted to reduce and/or eliminate thermal deformation is disclosed herein. In some embodiments, walls of the honeycomb structure comprise a first layer, optionally, a second layer, and a core layer adjacent to the first layer or between the first and second layers. The first and second layers may be compositions of Inconel or other high strength materials. The core layer may be copper or another thermally conductive material. The core layer is adapted to transmit heat between a first region of a structure and a second region. In this manner, heat can be transferred from the heated region to an unheated region, thereby reducing the temperature difference between the regions and thus the amount of thermal deformation.

36 Claims, 13 Drawing Sheets

(56) References Cited

FOREIGN PATENT DOCUMENTS

| | | |
|---|---|---|
| JP | 08-118522 | 5/1996 |
| JP | 9-507443 | 7/1997 |
| WO | WO-93/18910 | 9/1993 |
| WO | WO-94/06580 | 3/1994 |
| WO | WO-95/26877 | 10/1995 |
| WO | WO-99/38682 | 8/1999 |
| WO | WO-99/61235 | 12/1999 |

OTHER PUBLICATIONS

Final Office Action for U.S. Appl. No. 12/363,314, mailed Jun. 28, 2012, 10 pages.

Supplementary European Search Report for EP 09700696.9, mailed Jan. 16, 2013.

Notice of Reasons for Rejection (translation) for JP 2010-542385, mailed Dec. 20, 2012.

* cited by examiner

1100 ⤴

*All-Inc625 Chevron Tip Deflection: u=11.3mm (0.444")*

1102

*Inc625-HTC-Inc625 Chevron Tip Deflection: u=2.7mm (0.106")*

1104

*Inc625-HTC-Inc909 Chevron Tip Deflection: u=-1.5mm (-0.058")*

1106

THERMALLY CONDUCTIVE STRUCTURE

CROSS-REFERENCE TO RELATED APPLICATIONS

This application claims priority to U.S. Provisional Patent Application Ser. No. 61/020,688, filed on Jan. 11, 2008, the contents of which are incorporated by reference herein.

FIELD OF THE INVENTION

The present invention relates generally to the field of thermally conductive structures. More particularly, the present invention is directed in one exemplary aspect to providing a thermally conductive structure adapted to reduce thermal deformation.

BACKGROUND OF THE INVENTION

Many structural components of buildings, vehicles, mechanical devices and other works of construction include regions which are normally subjected to higher temperatures than other regions. For example, in a jet engine of an aircraft, the inner region of the engine housing (i.e., the surface of the engine housing closer to the exhaust) typically reaches higher temperatures than the outer region. The differences in temperature are often related to the thermal conductivity of the structural component.

In cases where the structural component possesses low thermal conductivity, heat will encounter resistance in transferring from the heated region to a cooler region. Without an adequate transfer mechanism for the heat, the resulting differential thermal expansion can cause stretching, tearing, and/or deformation in the structure or supporting materials. While the structure may be fabricated using alternative materials possessing high levels of thermal conductivity, these materials are often a poor choice for designers for other reasons (e.g., high price, heavy weight, low strength, etc.).

SUMMARY OF THE INVENTION

Various embodiments of the present invention are directed to a multi-layered honeycomb structure adapted to reduce and/or eliminate thermal deformation. The walls of the honeycomb structure may comprise a first layer with or without a second layer, and a core layer adjacent to the first layer or between the first and second layers. The first and second layers may be compositions of Inconel or other high strength materials, and can be of the same or different materials. The core layer may be copper or another thermally conductive material. The core layer is adapted to transmit heat from a first region of a structure to a second region. In this manner, the temperature difference between the two regions is diminished, thereby reducing thermal deformation.

Embodiments of the present invention may be used in a variety of applications. This includes, without limitation, exhaust nozzles, exhaust plugs, convergent/divergent flaps, and chevron-shaped sound baffles for jet engines.

In a first aspect of the invention, a honeycomb structure is disclosed. In one embodiment, the honeycomb structure comprises a plurality of cellular walls, wherein each of the cellular walls comprises: a first corrugated sheet of a first material; and a second corrugated sheet of a second material, wherein the second corrugated sheet is bonded to the first corrugated sheet, and wherein the second material comprises a material having a higher thermal conductivity than the first material.

In a second aspect of the invention, a honeycomb structure is disclosed. In one embodiment, the honeycomb structure comprises a first corrugated sheet of a first material; a second corrugated sheet of a second material; and a core sheet bonded to and positioned between the first and second corrugated sheets, wherein the core sheet comprises a third material having a higher thermal conductivity than the first material and the second material.

In a third aspect of the invention, a structure is disclosed. In one embodiment, the structure comprises: a plurality of corrugated cell walls; a first surface perpendicular to the corrugated cell walls and bonded to a first end of the corrugated cell walls; and a second surface perpendicular to the corrugated cell walls and bonded to a second end of the corrugated cell walls, wherein each of the corrugated cell walls comprises at least one layer adapted to conduct heat from the first surface to the second surface and thereby reduce thermal deformation of the first surface.

In a fourth aspect of the invention, a method of producing a thermally conductive chevron is disclosed. In one embodiment, the method comprises: forming a plurality of strips comprising a first layer and a second layer bonded to the first layer, wherein the second layer comprises a high-thermal conductivity material; forming a plurality of corrugated strips from the plurality of strips; forming a honeycomb structure from the plurality of corrugated strips; bonding a first surface to a first side of the honeycomb structure; and bonding a second surface to a second side of the honeycomb structure.

In a fifth aspect of the invention, a method for utilizing a thermally conductive chevron is disclosed. In one embodiment, the method comprises: providing the thermally conductive chevron, wherein the thermally conductive chevron comprises a plurality of hexagonal cells formed from a plurality of cell walls; a first surface perpendicular to the hexagonal cells and bonded to a first end of the hexagonal cells; and a second surface perpendicular to the hexagonal cells and bonded to a second end of the hexagonal cells, wherein each of the cell walls comprises at least one layer adapted to transfer heat from the first surface to the second surface and thereby reduce thermal deformation of the first surface; and attaching the thermally conductive chevron to an engine.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

Although embodiments of the invention may be described and illustrated using a core layer comprising a honeycomb structure, it should be understood that embodiments of this invention are not so limited, but may also include other structural configurations, shapes, and/or cellular geometries.

Figure 1:
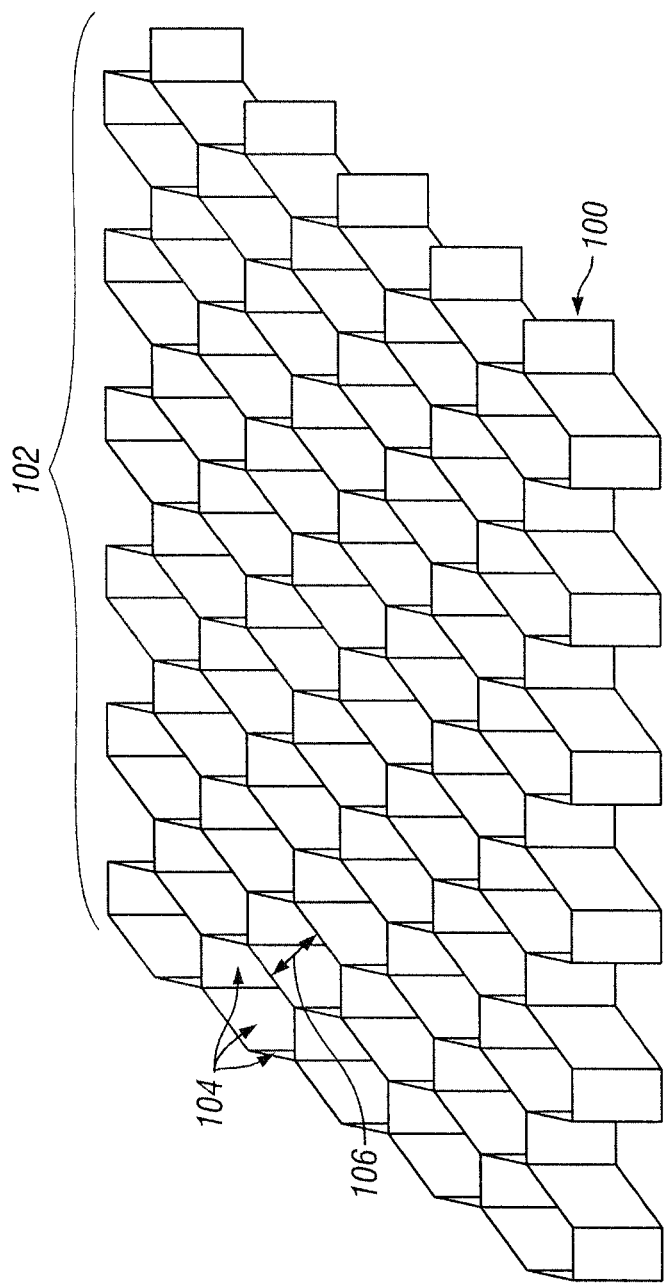
FIG. 1 is an illustration of a section of a honeycomb structure according to an embodiment of the invention.

FIG. 1 is an illustration of a section of a honeycomb structure 100 that may be used according to one embodiment of the invention. The hexagonal cells of the honeycomb structure 100 allow a structure to resist bending. In this example, the honeycomb structure 100 comprises a plurality of hexagonal cells 102, where the walls 104 of each hexagonal cell 106 are perpendicular to adjoining surfaces (which are not shown in FIG. 1). The walls 104 may be made of a single layer or multiple layers of materials such as metals. In this example, the honeycomb structure 100 is formed from sheets of corrugated metal as explained in detail below.

Figure 2:
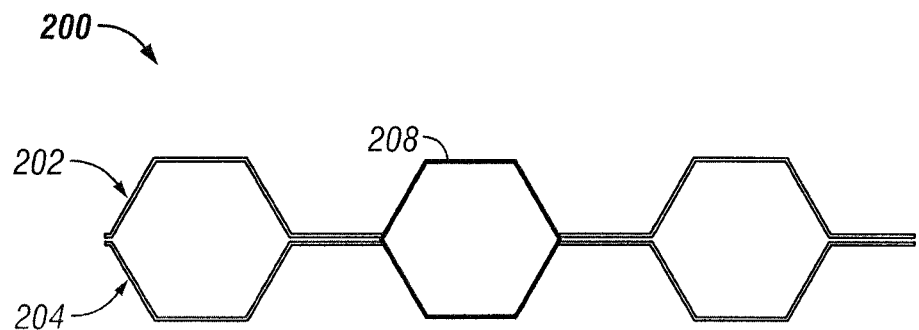
FIG. 2 is an illustration of two corrugated sheets forming hexagon cells according to an embodiment of the invention.

FIG. 2 shows two corrugated strips 202/204 that could be used to form the honeycomb structure 100. When used in combination, the two corrugated strips 202/204 form hexagon cells 208 similar to the hexagon cell 106 in FIG. 1. The metal may be corrugated in a wave-like pattern, and bonded together to form the honeycomb structure 100 as explained below.

Figure 3:
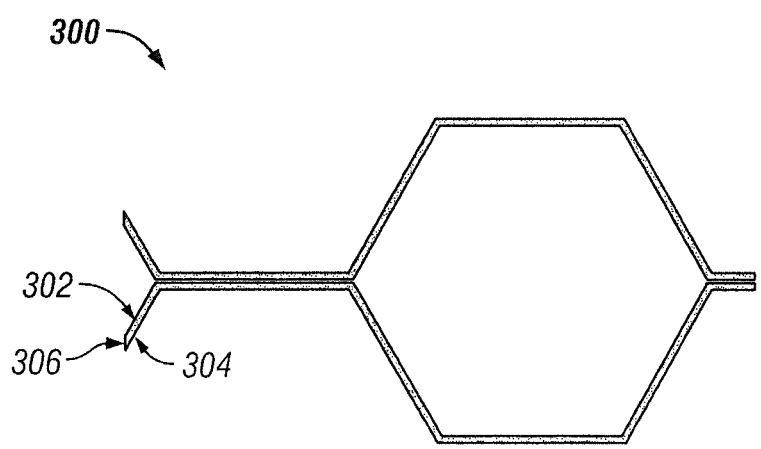
FIG. 3 is an illustration of a cross section of a honeycomb structure showing corrugated strips bonded together to form the honeycomb structure according to an embodiment of the invention.

FIG. 3 is an illustration of a cross section of a honeycomb structure 300 showing corrugated layers 302/304 bonded together to form the honeycomb structure 300 according to an embodiment of the invention. A first corrugated sheet 302 may be bonded to a second corrugated sheet 304, for example by brazing the junction 306 between the first corrugated sheet 302 and the second corrugated sheet 304. Brazing is a joining process whereby a filler material is heated to melting temperature between two close-fitting parts, and diffused between the two parts via capillary action. At its liquid temperature, the molten filler material interacts with a thin layer of the two parts, cooling to form a strong, sealed joint. The melting temperature of the braze alloy is generally lower than the melting temperature of the materials being joined. The brazed joint becomes a sandwich of different layers metallurgically bonded to each other. Although brazing is one exemplary method of bonding described herein, those of skill in the art will recognize that brazing is only one type of bonding that may be used within the context of the present invention. Other well-known techniques for bonding two structures together include various types of welding, soldering, adhering (e.g., permanent adhesives or glue), etc. Any type of bonding known in the art may be utilized in accordance with one or more embodiments of the present invention. Note that in many embodiments, the honeycomb structure 800 is sandwiched between two layers of metal.

Figure 4:
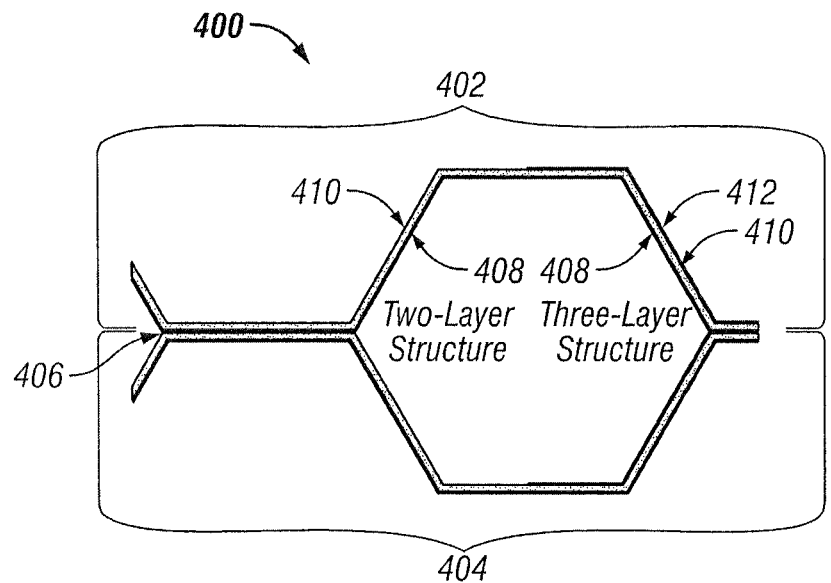
FIG. 4 is an illustration of a cross section of a wall of a honeycomb structure cell according to an embodiment of the invention.

FIG. 4 is an illustration of a cross section of a wall of a honeycomb structure cell 400 according to an embodiment of the invention. The wall of the honeycomb structure cell 400 (see also 104 in FIG. 1) comprises a first corrugated sheet 402 (similar to 302 in FIG. 3) coupled by a bonding 406 to a second corrugated sheet 404 (similar to 304 in FIG. 3). The bonding 406 (similar to 306 in FIG. 3) may be done, for example, by brazing, gluing, or welding.

In order to improve the thermal conductivity of the walls of the honeycomb structure cell 100, a high thermal conductivity material is used in combination with a base material to make the corrugated sheets 402/404. Accordingly, each corrugated sheet 402/404 comprises a layer of high thermal conductivity material sandwiched between and bonded to one or more layers of a base material. In this manner, each corrugated sheet 402/404 may comprise a first layer 408 with or without a second layer 412, and a core layer 410. The first layer 408 and the second layer 412 may be made of a high strength base material, such as, without limitation, Inconel, titanium, or stainless steel. The core layer 410 may comprise a high-thermal conductivity material, such as, without limitation, copper. The combination of the two layers 408/410 or the three layers 408/410/412 increases the thermal conductivity of the walls of the honeycomb structure cell 100 while maintaining a strong highly temperature resistant structure.

Note that in some embodiments, only two layers are provided: a first layer comprising the base material, and a second layer comprising the high-thermal conductivity material. In one embodiment, the second layer is bonded to one side of the first layer, thus forming an inner core material within the hexagonal cells of successive cellular walls. In other embodiments, the first layer is surrounded by two layers comprising high strength materials.

The choice of materials used for the layers 408/410/412 can affect the way a structural component changes under temperature and other environmental factors such as pressure. The first layer 408 and the second layer 412, if used, may be made of layers of the same or different materials. According to one embodiment, the first layer 408 and the second layer 412 may both be made of Inconel-625. According to another embodiment, the first layer 408 may be made of Inconel-625 and the second layer 412 may be made of stainless steel. According to one embodiment, the high thermal conductivity material of the core layer 410 may comprise copper or other high conductivity material.

The choice of materials used for the layers 408/410/412 can also affect the weight of the structural component. For example, a chevron made with Inconel and copper, as explained above, can be about 65% lighter than a solid titanium chevron.

The layers 408/410/412 can also have various thicknesses. For example, a first layer 408 of Inconel (e.g., Inconel-625) or stainless steel may comprise a thickness of 0.002 inches. A core layer 410 of copper may comprise a thickness of 0.004 inches, and a second layer 412 of Inconel (e.g., Inconel-625) or stainless steel, if used, may comprise a thickness of 0.002 inches.

Figure 5:
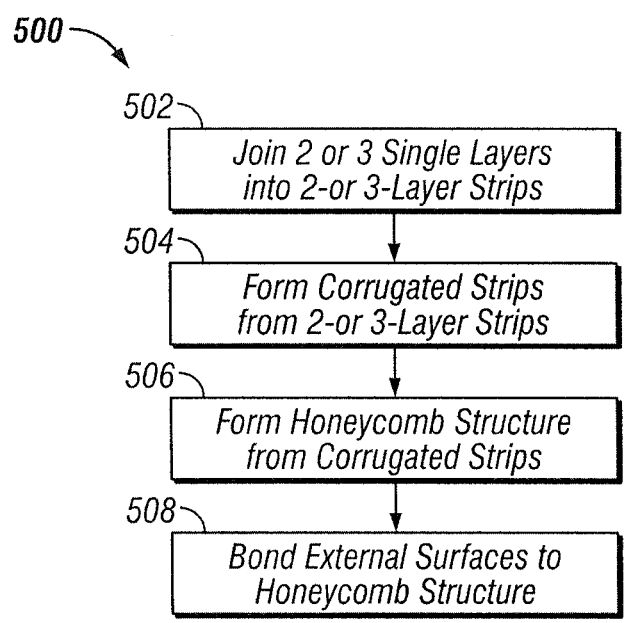
FIG. 5 shows an exemplary flow diagram illustrating a process for manufacturing a honeycomb structure according to an embodiment of the invention.

FIG. 5 shows an exemplary flow diagram illustrating a process 500 for manufacturing a honeycomb structure according to one embodiment of the invention. The various tasks performed in connection with process 500 may be performed manually or by hardware, software, firmware, a computer-readable medium having computer executable instructions for controlling and operating the process method, or any combination thereof. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

The process 500 may begin by forming a plurality of three layer strips comprising a first layer, a second layer, if used, and a core layer bonded to the first layer or bonded to and sandwiched between the first and second layers (task 502). In one embodiment, a method for forming a two or three layer strip comprises receiving separate reels of strips of each type of material, overlaying each of the two or three strips and pressing them with sufficient force to bond them together. In another embodiment, a method for forming a two or three layer strip comprises receiving separate reels of strips of each type of material, overlaying each of the strips and using an adhesive to bond the strips into a two or three layer strip. Note that myriad other methods may be used according to embodiments of the present invention.

Additionally, the first and second layers may comprise an Inconel alloy such as Inconel-625, stainless steel, or another high strength alloy. The core layer may comprise copper or another material possessing high thermal conductivity.

Next, a plurality of corrugated strips 302/304 (FIG. 3) may be formed from the two or three layer strips (task 504). In one embodiment, a method for forming a corrugated strip 302/304 from a two or three layer strip comprises receiving a two or three layer strip reel, and pressing the corrugation shape into the two or three layer strip using a rolling press. Another method for forming a corrugated strip from a two or three layer strip comprises receiving a two or three layer strip and stamping the corrugations into the two or three layer strip. Each corrugation of the corrugated strip forms a half of a hexagonal cell 402/404 of the honeycomb cell structure 400 (FIG. 4).

The next step of the process 500 comprises forming a honeycomb structure 100 (FIG. 1) from the plurality of corrugated strips (task 506). The plurality of corrugated strips are aligned to form hexagonal cells 106 (FIG. 1), and the plurality of corrugated strips are bonded together to form the honeycomb structure 100. Filler materials may be inserted between the strips to improve bonding. For example, braze foil or powder may be used as filler materials if the form of bonding is brazing. It is understood that any metals, metal alloys, or combinations thereof, that are suitable for brazing are contemplated to be within the scope of the present invention (e.g., copper, aluminum, titanium, etc.). Additionally, any type of known brazing material in the form of sheets, foils, sprays, powders, paste or slurries, for example, may be utilized in accordance with the present invention. Furthermore, it is contemplated that some embodiments of the invention may utilize non-metal core materials and non-metal external sheets. For example, known synthetic and/or polymer materials (e.g., Kevlar) may be used to form an injection-molded core and thereafter bonded (e.g., sonically welded and/or vibration welded) to synthetic and/or polymer outer sheets.

The honeycomb structure 100 may be cut or machined to the proper shape for use in a structural component. The cutting or machining may be done before or after surfaces of the structural component are bonded to the honeycomb structure 100. Cutting or machining may be performed by water jet, laser, or other cutting or machining methods. For example, the honeycomb structure 100 may be tack welded to a metal plate as a holding fixture for Wire Electrical Discharge Machining (wire EDM) to the correct thickness and/or shape. Tack welding comprises welding with small separated welds, or the welding of two or more metals by individual welds at isolated points.

Electrical Discharge Machining (EDM) is a machining method used for hard metals or those that may not be possible to machine with traditional techniques. EDM can remove metal by producing a rapid series of repetitive electrical discharges between an electrode and the piece of metal being machined. The repetitive discharges create successively deeper craters in the work piece until the final shape is produced. The small amount of material that is removed from the work piece may be flushed away with a continuously flowing fluid. EDM works with materials that are electrically conductive. Metals that can be machined with EDM include, for example, steel, titanium, and Inconel. EDM can be useful for cutting intricate contours or delicate cavities that would be difficult to produce with other cutting tools.

In wire EDM, the electrode may be a thin wire, and the wire may be drawn through the honeycomb structure. The wire need not touch the metal to be cut. Rather, electrical discharges can cut the honeycomb structure. The electrical discharges can remove small amounts of material and allow the wire to be moved through the honeycomb structure. The path of the wire is typically controlled by a computer, which allows complex shapes to be produced. Wire EDM may be performed in a bath of water or other liquid, and can be used to cut the hardest of conductive materials.

After the honeycomb structure has been formed, exterior surfaces of the structural component may then be bonded to it (task 508). For example, an inner surface may be bonded to a first side of the honeycomb structure 100, while an outer surface may be bonded to a second side of the honeycomb structure 100. Optionally, an edge surface and/or mounting bracket may also be bonded to the honeycomb structure and/ or the inner and outer surfaces. The resulting structure may then be cut into the proper shape by a water jet, laser, or by another cutting method. The shaped structure may then be machined (e.g., via EDM), smoothed, and finished by, for example, bead blasting.

Figure 6:
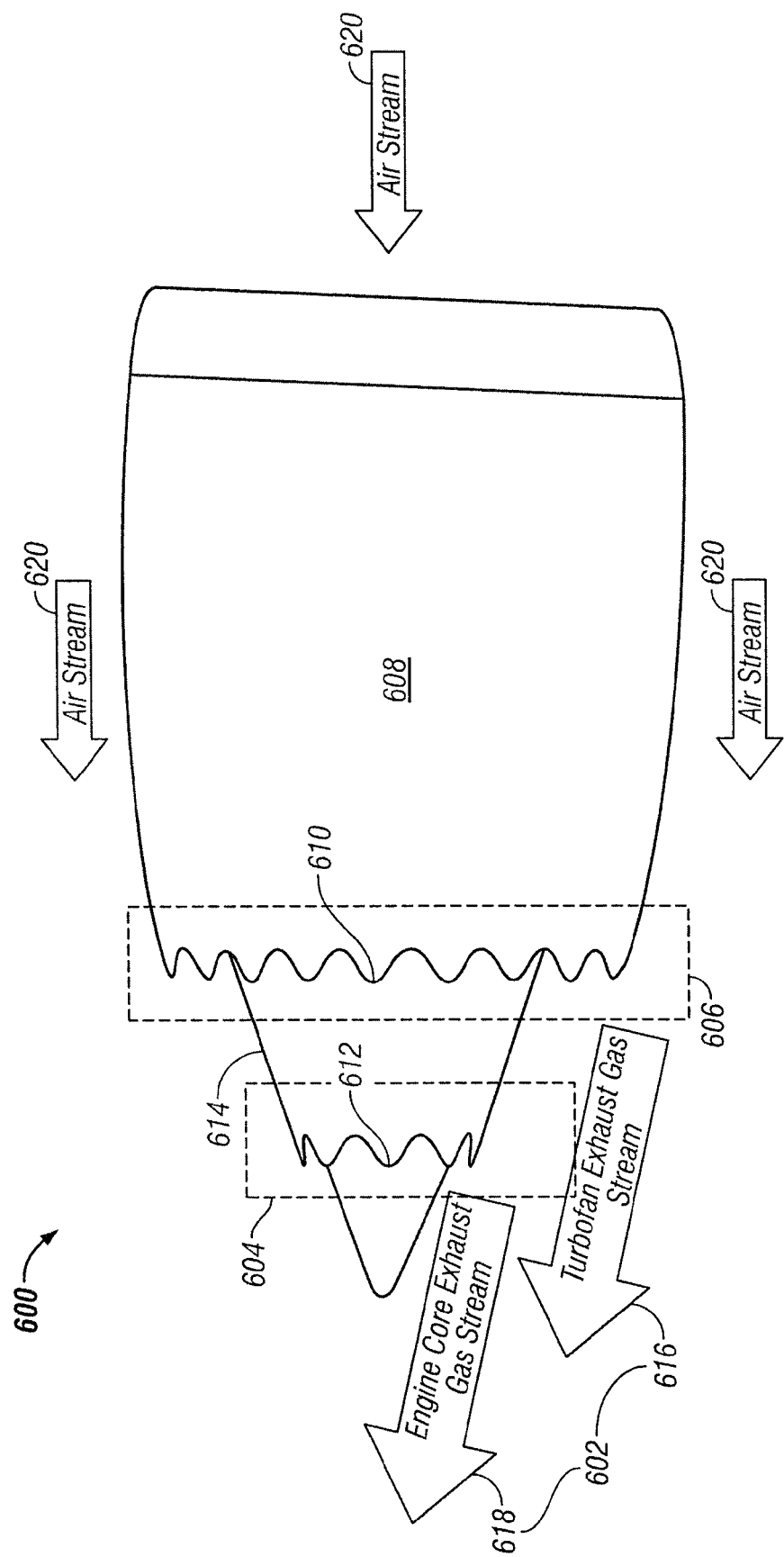
FIG. 6 is an illustration of a turbine engine showing locations where a turbine engine chevron may be located according to an embodiment of the present invention.

FIG. 6 is an illustration of a turbine engine 600 showing exemplary locations where a turbine engine chevron may be located according to one embodiment of the present invention. Chevrons 610/612 may be located on the engine exhaust gas stream 602 (which includes exhaust gas streams 616/618) in order to reduce noise from the turbine engine 600. For example, chevrons 612 may be coupled to the back of a jet engine exhaust nozzle 614, where high temperature exhaust gas 618 may deform the chevrons. Chevrons 612 can allow a proper mix of exhaust gas 618 with the turbofan exhaust gas stream (fan-driven bypass air) 616. Similarly, chevrons 610 may be coupled to the back of the engine nacelle 608 to allow a proper mix of the turbofan exhaust gas stream (fan-driven bypass air) 616 with the ambient air stream 620. In this manner, the chevrons 610/612 can reduce the noise from the turbine engine 600 by producing a better mix of gas streams 620/616/618.

The chevrons 610/612 reduce noise by reducing turbulence in the mixing of gas streams from opposite sides of the chevron. Engine core exhaust gas 618 from the engine's core (not shown) flowing through the engine exhaust nozzle 614 is one gas stream. The fan-driven bypass air 616 flowing through the nacelle 108 is a second gas stream. The ambient air 620 that passes around the nacelle 608 is a third gas stream. When these three gas streams are properly mixed by chevrons 610/612, engine noise is reduced. However, as mentioned above, deformation can reduce the effectiveness of the engine exhaust nozzle chevron 612 in reducing mixing turbulence noise. This is explained in further detail in the context of discussion of FIG. 8 below.

Figure 7:
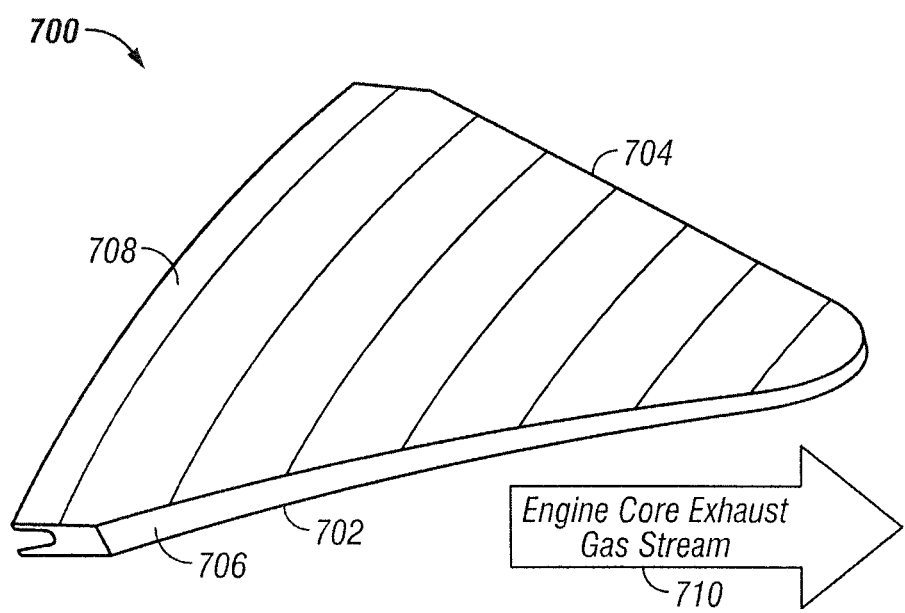
FIG. 7 is an illustration of a turbine engine chevron according to an embodiment of the invention.

FIG. 7 is an illustration of a turbine engine chevron 700 according to embodiments of the present invention. The turbine engine chevron 700 may comprise an inner surface 702, an outer surface 704, an edge surface 706, and a mounting bracket 708. In one embodiment, the inner surface 702 can be the side of the turbine engine chevron 700 facing the engine core exhaust gas stream 710 (also see 618 in FIG. 6), and the outer surface 704 can be the side of the chevron facing away from the engine core exhaust stream 710. The edge surface 706 covers and protects the internal structure of the turbine engine chevron 700. The mounting bracket 708 may be used to connect the turbine engine chevron 700 to, for example, the back of a turbo jet engine exhaust nozzle 614, or to the back of the engine nacelle 608 (FIG. 6). The inner surface 702, the outer surface 704, the edge surface 706, and the mounting bracket 708 may be coated with paint or other decorative or protective coatings.

Because the heat of the engine core exhaust stream 618 is primarily exposed to the inner surface 702, a temperature difference can develop between the inner surface 702 and the outer surface 704. Furthermore, temperature differences can develop across the surface of a chevron due to uneven heating. As used herein, a thermal gradient comprises a temperature difference between various locations on the turbine engine chevron 700.

Figure 8:
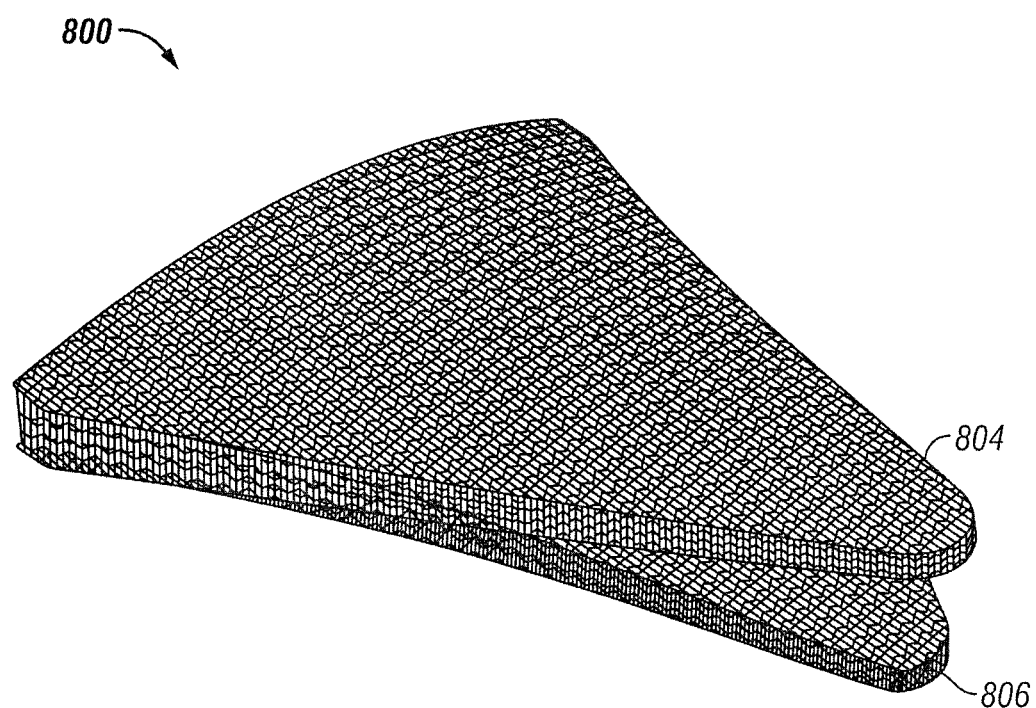
FIG. 8 is an illustration of a turbine engine chevron showing deflection of the chevron as may occur due to a thermal gradient.

A thermal gradient can cause a difference in thermal expansion between the side exposed to the exhaust and the side that is not exposed. FIG. 8 is an illustration of a turbine engine chevron 800 showing deflection of the turbine engine chevron 800 as may occur due to a thermal gradient. A first position 804 illustrates a shape of the turbine engine chevron 800 prior to heating from the engine core exhaust stream 710. A second position 806 illustrates a shape of the turbine engine chevron 800 after heating by the engine core exhaust stream 710.

Figure 9:
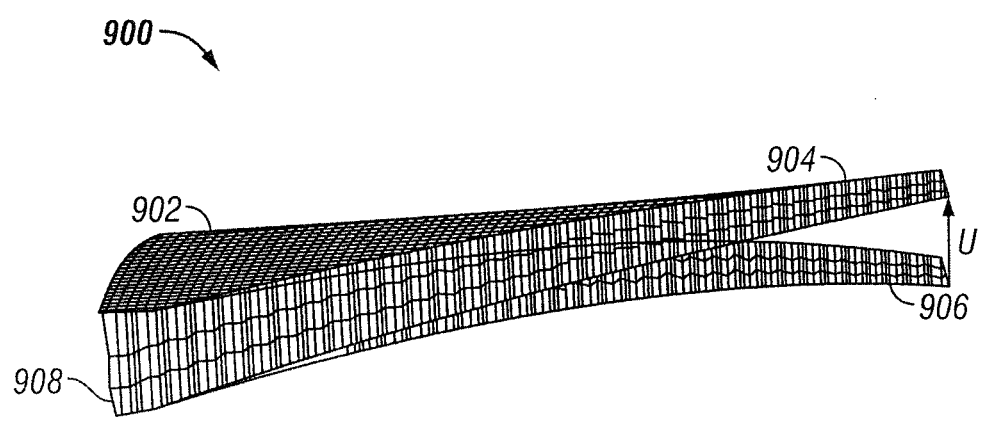
FIG. 9 is an illustration of a cross section of a turbine engine chevron showing deflection of the chevron as may occur due to a thermal gradient.

FIG. 9 is an illustration of a cross section of a turbine engine chevron 900 showing deflection $u$ of the chevron as may occur due to a thermal gradient. A first position 904 illustrates a shape of the turbine engine chevron 900 prior to heating from the engine core exhaust stream 710. A second position 906 illustrates a shape of the turbine engine chevron 902 after heating by the engine core exhaust stream 210. The amount of the deflection $u$ depends on the temperature and the materials used to make the turbine engine chevron 900.

In order to minimize deflection $u$, materials with a high strength have been used to make turbine engine chevrons. Inconel is one such material that has been used for making turbine engine chevrons because of its high strength at high temperatures (e.g., greater than about 1000° C.). However, Inconel has limited thermal conductivity (e.g., 9.8 W/m-K), which may cause increased deflection $u$ at high temperatures. A higher thermal conductivity than that provided by the Inconel may reduce thermal gradients across a chevron. Embodiments of the invention, described herein use a high thermal conductivity material in combination with a base material such as Inconel, titanium, or stainless steel to improve thermal conductivity, reduce thermal gradients, and minimize deflection $u$.

Figure 10:
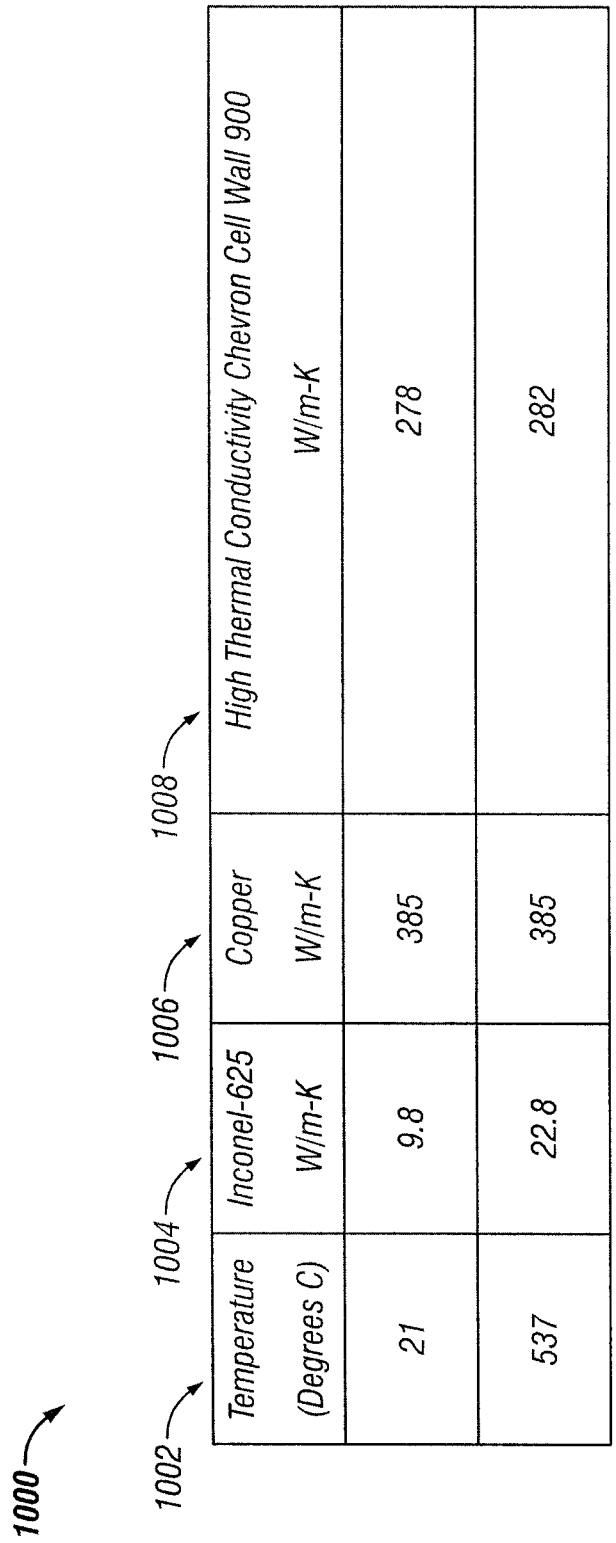
FIG. 10 shows a table of thermal conductivity at several temperatures for Inconel-625, copper, and a high thermal conductivity chevron cell wall.

The deflection is disadvantageous because it may bend and change the aerodynamic shape of the chevron causing an increase in drag and/or noise. For example, FIG. 10 shows a table of thermal conductivity 1000 for Inconel-625 1004, copper 1006, and a high thermal conductivity chevron cell wall 1008 (402/404 in FIG. 4) at two temperatures 1002 (21° C. and 537° C.). In this example, the high thermal conductivity chevron cell wall 1008 comprises 0.002 inches of Inconel-625 (layers 408/412), and 0.005 inches of copper (core layer 410). As shown in FIG. 10, at temperatures 1002, the copper 1006 has a higher thermal conductivity than Inconel-625 1004. Moreover, at temperatures 1002 the high thermal conductivity chevron cell wall 1008 (with both Inconel-625 and copper) has a higher thermal conductivity than Inconel-625 1004 alone. Thus, a thermally conductive chevron, according to various embodiments of the invention, may have a significantly reduced deflection $u$ as compared to an all Inconel-625 1004 chevron.

Figure 11:
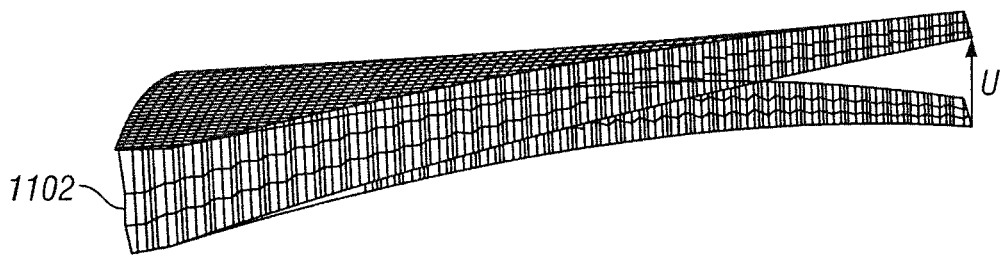
FIG. 11 illustrates a reduction in deflection of a chevron with the three layer honeycomb wall structure for three combinations of materials in accordance with three embodiments of the invention.
Figure 11:
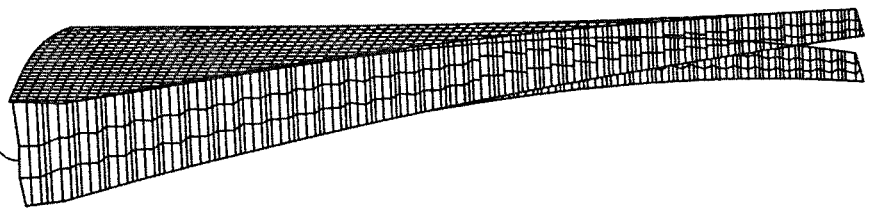
Figure 11:
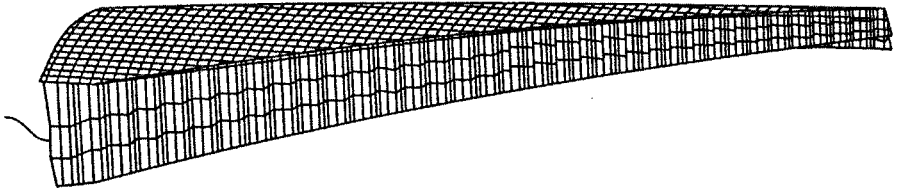

FIG. 11 illustrates a reduction in deflection $u$ of a chevron for three combinations of materials. The first material combination 1102 comprises an all-Inconel-625 (i.e., the first layer 408, the core layer 410, and the second layer 412 are all Inconel-625, or constitute a single layer of Inconel-625). The measured amount of the deflection $u$ for the first material combination 1102 may be about 11.3 millimeter (mm) in this example. According to an embodiment of the invention, the second material combination 1104 comprises a first layer 408 of Inconel-625, a core layer 410 of high-temperature conductivity material (HTC) such as copper, and a second layer 412 of stainless steel. The measured amount of the deflection $u$ for the second material combination 1104 is 2.7 mm in this example, which is less than the deflection $u$ of the first material combination 1102. According to another embodiment, the third material combination 1106 comprises a first layer 408 of Inconel-625, a core layer 410 of high-thermal conductivity material (HTC) such as copper, and a second layer 412 of stainless steel. The measured amount of the deflection $u$ for the third material combination 1106 is 1.5 mm in this example, which is less than both the first material combination 1102 and the second material combination 1104.

Figure 12:
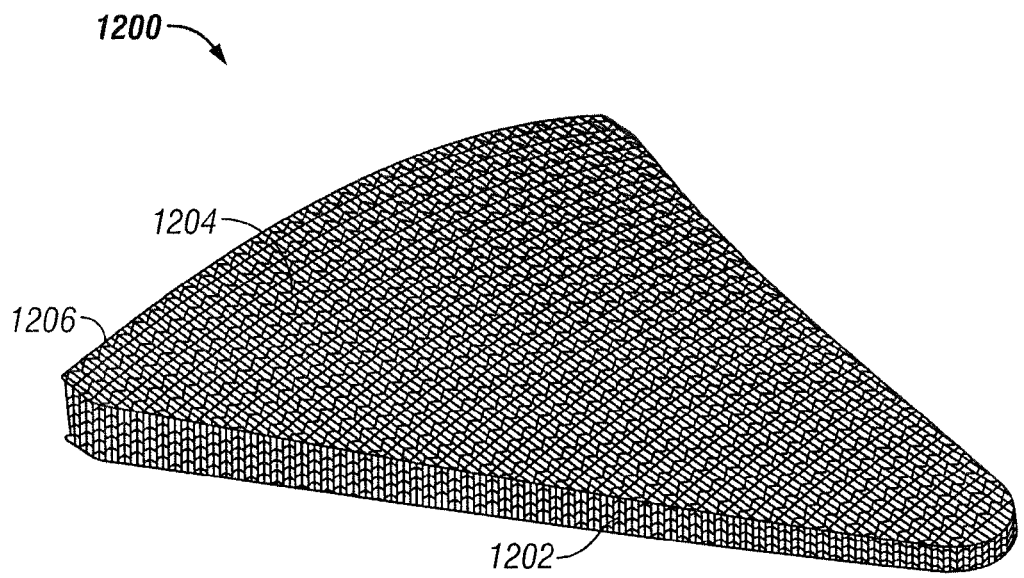
FIG. 12 is an illustration of the internal structure of a turbine engine chevron according to an embodiment of the invention.

FIG. 12 is an illustration of the internal structure 1200 of a turbine engine chevron 700 according to an embodiment of the invention. The internal structure 1200 may comprise an inner surface 1202 (corresponding to inner surface 702 without a coating), an outer surface 1204 (corresponding to outer surface 704 without a coating), and a honeycomb structure 1206. The interior structure 1200 provides physical support for a turbine engine chevron 700, and is generally made of a light and stiff material to reduce deformation from aerodynamic stress.

The inner surface 1202 and the outer surface 1204 are attached to the honeycomb structure 1206, and may be of the same or different materials. The type of material used to form the inner and outer surfaces 1202/1204 may depend on the utility of the chevron 700. For example, if the inner surface 1202 is exposed directly to the engine core exhaust stream 710 and the outer surface 1202 is not, then it may be appropriate to make the inner surface 1202 from a material more heat resistant and/or having a lower coefficient of thermal expansion than the outer surface 1202. In addition to the degree of contact with the engine core exhaust stream 710, the heat resistance of the materials used to manufacture the chevron 700 may depend on the degree of heat conduction through the honeycomb structure 1206.

In one embodiment, the inner surface 1202 may comprise a high temperature material capable of withstanding the high temperatures (e.g., greater than about 1000° C.). Inconel-625 is an example of such a material. Inconel-625 is a nonmagnetic, corrosion and oxidation-resistant, nickel-based alloy. Its outstanding strength and toughness at temperatures up to about 2000° F. (about 1093° C.) are derived primarily from the solid solution effects of the refractory metals, columbium and molybdenum, in a nickel-chromium matrix. Inconel-625 has excellent fatigue strength and stress-corrosion cracking resistance to chloride ions.

The outer surface 1204 may also comprise a high temperature material capable of withstanding the high temperatures, but may have lower requirements (about 200° F.-300° F.) since it may not be in direct contact with the engine core exhaust stream. Accordingly, the outer surface 1204 may also comprise Inconel-625, or it may comprise another type of material such as stainless steel. Stainless steel has a significantly higher coefficient of thermal expansion than the Inconel, helping to minimize the thermal deformation of the sandwich.

As described above with respect to FIGS. 1-3, the honeycomb structure 1206 is a hollow structure composed of bonded strips of material assembled to provide high strength with low weight. The hollow interior of the hexagonal cells form multiple hollow tubes between the inner surface 502 and the outer surface 504. The hollow nature of the honeycomb structure gives the chevron its low weight.

Figure 13:
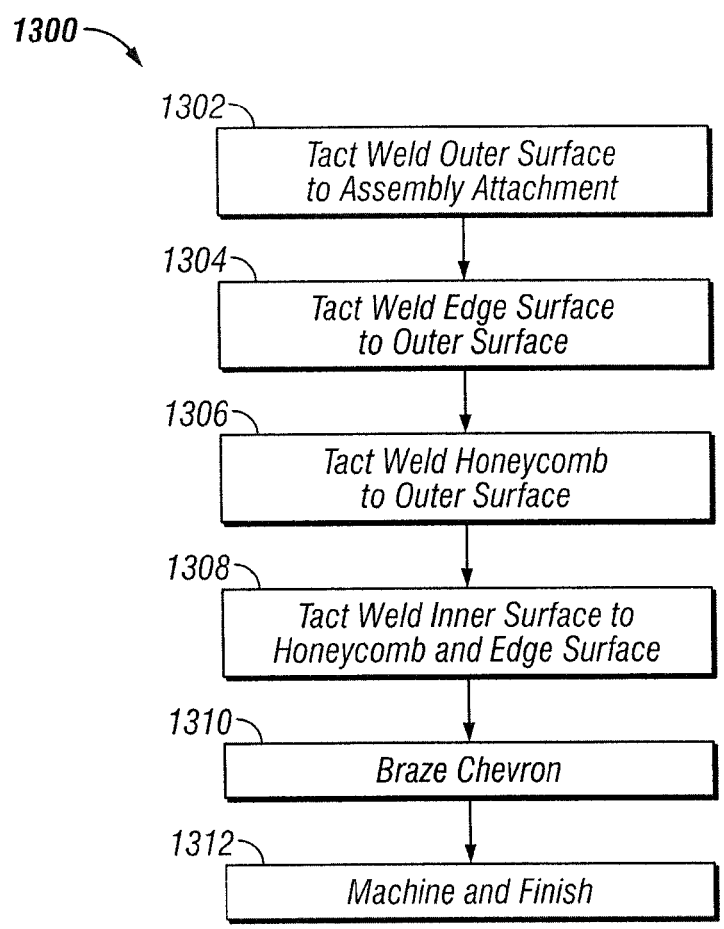
FIG. 13 shows an exemplary flow diagram illustrating a process for assembling a thermally conductive chevron according to an embodiment of the invention.

FIG. 13 shows an exemplary flow diagram illustrating a process 1300 for assembling a thermally conductive chevron according to one embodiment of the present invention. Exterior surfaces (e.g., the surfaces 702/704/706/708 shown in FIG. 7) are tack welded to the formed core honeycomb structure 1206 prior to brazing, which allows for improved subsequent brazing and an improved quality of thermally conductive chevron 700. These surfaces (also known as "skins") may be cut to a correct size to form a chevron (for example, by a water jet). The outer surface 704 of a chevron 700 is also known as an outer diameter (O.D.) skin, the inner surface 702 of a chevron 700 is also known as an inner diameter (I.D.) skin, and the edge surface 706 is also known as a segmented windage strip. It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein.

The assembly process may begin with the outer surface 704 tack welded onto an assembly attachment (task 1302). An assembly attachment is a frame for holding an object under assembly. Assembly attachments are well known in the art, so the details of such an assembly attachment are not described herein. The honeycomb structure may then be placed and tack welded onto the outer surface 704. The edge surface 706 may be tack welded onto the edge of the outer surface 704 using, for example, an approximately 0.030 inch wire to ensure sealing of the edge surface to the outer surface (task 1304). In one embodiment, the wire comprises a close-out wire adapted to prevent the inside of the chevron from being exposed to air or foreign objects. The honeycomb structure 1206 may then be placed and tack welded onto the outer surface 704 using, for example, an approximately 0.010 inch wire (task 1306). The inner surface 702 may then be tack welded onto the honeycomb structure 1206 and edge surface 706 using, for example, an approximately 0.030 inch wire (task 1308). The result is an assembled chevron 700. The assembled chevron 700 is then heated to complete the brazing process (task 1310), then machined and finished (task 1312), e.g., via CNC milling, EDM and bead blasting.

Figure 14:
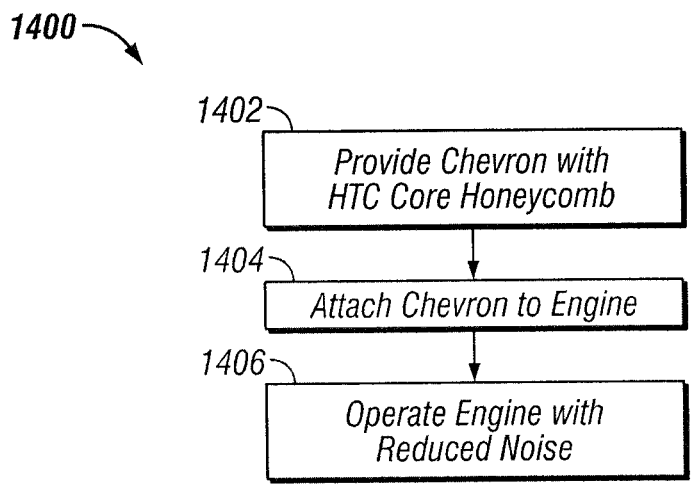
FIG. 14 shows an exemplary flow diagram illustrating a process for utilizing a thermally conductive chevron according to an embodiment of the invention.

FIG. 14 shows an exemplary flow diagram illustrating a process 1400 for utilizing a thermally conductive chevron 700 according to an embodiment of the invention. It should be appreciated that process 1400 may include any number of additional or alternative tasks, the tasks shown in FIG. 14 need not be performed in the illustrated order, and process 1400 may be incorporated into a more comprehensive procedure or process having additional functionality not described in detail herein.

The process 1400 for utilizing a thermally conductive chevron may begin by providing a chevron 700 (task 1402), and attaching the chevron 700 to an engine 600 (task 1404). In this example, the chevron 200 may be attached on the back of a turbo jet engine exhaust nozzle 614 (or other location) via the mounting bracket 708 using various mounting methods. For example, the mounting bracket 708 may be bonded to the engine exhaust 602 via, for example, bolting, riveting, welding, brazing, fastening, clipping, and the like. The process 1400 may then continue by operating the engine 600 with the chevron 700 attached to reduce noise from the engine 600 (task 1406).

The honeycomb structure described with reference to FIGS. 1-3 may also be used to implement convergent and/or divergent flaps according to some embodiments of the present invention. These flaps are used, for example, to redirect fluid flow in the exhaust nozzle of a jet engine.

Many conventional jet engines comprise a core section formed of compression stages for raising the pressure of air entering the engine, a combustor for mixing the air with fuel and for burning the mixture to create a high energy gas stream, turbine stages for extracting power from the high energy gases to run the compression stages, and an afterburner for raising the energy level of the gas stream prior to discharge from the engine. An exhaust nozzle is typically used for discharging exhaust gases.

Figure 15:
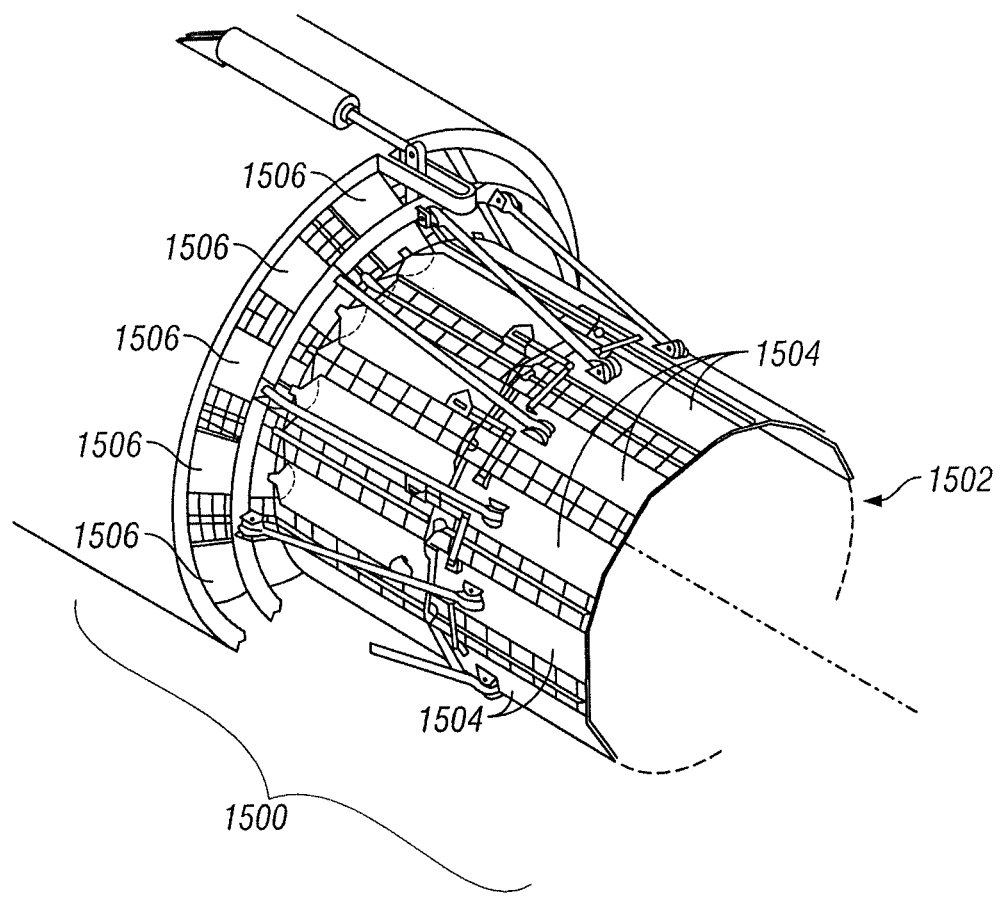
FIG. 15 illustrates an exhaust nozzle assembly as known in the prior art.

FIG. 15 illustrates an exhaust nozzle assembly 1500 as known in the prior art. Gases from the afterburner are discharged from the engine through a circular aperture 1502 at the downstream end of the exhaust nozzle assembly 1500. The exhaust nozzle assembly 1500 typically comprises a plurality of circumferentially arranged segments (called divergent flaps 1504) which are deployable to vary the diameter of the aperture 1502 through which the exhaust gas flows. The divergent flaps 1504 are used to redirect fluid flow in the exhaust nozzle assembly 1500 in order to modulate speed and/or direction of travel of the jet aircraft.

The geometry of the exhaust nozzle assembly 1500 may be variable upstream of the aperture 1502 as well. For example, a plurality of convergent flaps 1506 may be used to restrict a flow path in order to maximize the exit gas velocity at a given nozzle throat area. Note that since the velocity and acceleration of the jet aircraft depend in part upon the configuration of the divergent flaps 1504 relative to the convergent flaps 1506, both sets of flaps (1504/1506) may be used to attain various velocities and accelerations in the jet aircraft.

Figure 16:
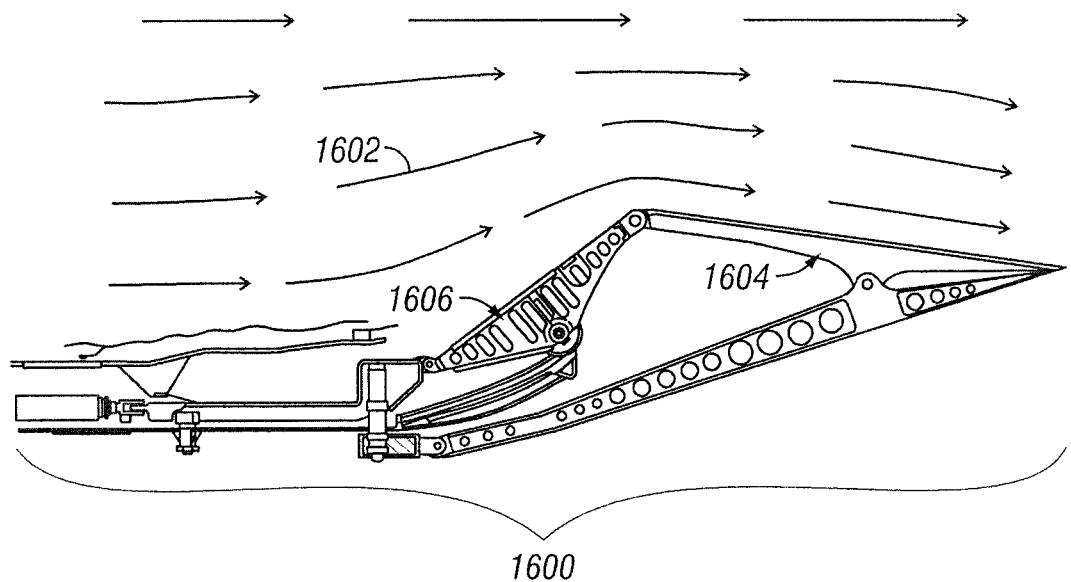
FIG. 16 is a perspective view of a convergent/divergent flap assembly as known in the prior art.

FIG. 16 is a perspective view of a conventional convergent/divergent flap assembly 1600. As shown by the figure, a convergent flap 1606 is adapted to redirect a fluid flow 1602 toward the center of the exhaust aperture 1502. A divergent flap 1604 subsequently varies the diameter of the outlet path downstream from the convergent flap 1606. In this manner, exhaust gas velocities may be increased, for example, so as to enable an aircraft to attain supersonic velocities.

Conventional flaps (both convergent 1506/1606 and divergent 1504/1604) are subject to temperature gradients developing between portions of the flap that are closer to the fluid flow 1602 and are therefore subject to relatively higher temperatures, and portions of the flap that are situated at farther distances from the fluid flow 1602. If the flap does not possess adequate thermal conductivity, heat may resist transfer and build within regions of the flap that are closer to the fluid flow 1602, leaving the regions of the flap that are farther from the fluid flow colder. The resulting differential thermal expansion may cause stretching, tearing, and/or thermal deformation of the supporting materials. This may cause wear or damage to the flap and may sometimes result in a deflection similar to that illustrated in FIGS. 8, 9, and 11.

The honeycomb structure described above (see FIGS. 1-3 and accompanying text) may be used to facilitate thermal conductivity in a manner similar to that described above with respect to the thermally conductive chevron, and therefore mitigate and/or prevent each of the aforementioned effects.

Figure 17:
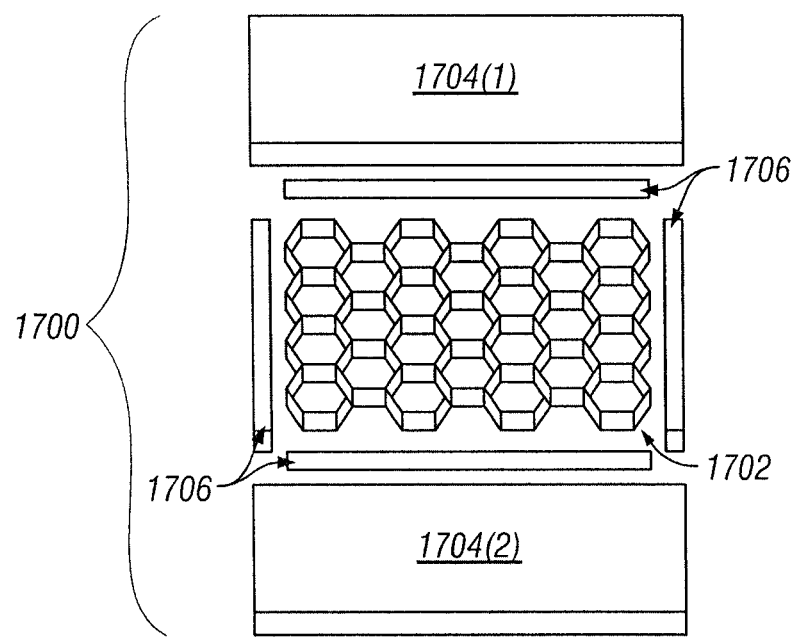
FIG. 17 illustrates a flap assembly according to one embodiment of the present invention.

For example, FIG. 17 illustrates a flap assembly 1700 according to one embodiment of the present invention. Flap assembly 1700 comprises a honeycomb core layer 1702 adapted to enable heat to transfer from a first exterior surface 1704(1) to a second exterior surface 1704(2). In some embodiments, one or more edge surfaces 1706 may be situated around the perimeter of the honeycomb structure 1702 so as to protect the honeycomb structure 1702 from external forces, contamination, or thermal degradation.

The first and second exterior surfaces 1704 may comprise an Inconel alloy such as Inconel-625 or stainless steel. The honeycomb structure 1702 may comprise a high strength material such as Inconel together with copper or another material possessing high thermal conductivity. Note that the flap assembly 1700 depicted in FIG. 17 may be manufactured in the manner described above (see FIG. 5 and accompanying text).

The honeycomb structure described with reference to FIGS. 1-3 may also be used to implement one or more surfaces of an exhaust nozzle according to embodiments of the present invention. An exhaust nozzle may be used in a variety of applications including, for example, jet engines, rocket engines, ballistic weapons, engine-driven appliances such as lawn-mowers, vehicles (e.g., cars, motorcycles, all-terrain vehicles, etc.) as well as other locomotive applications.

Figure 18:
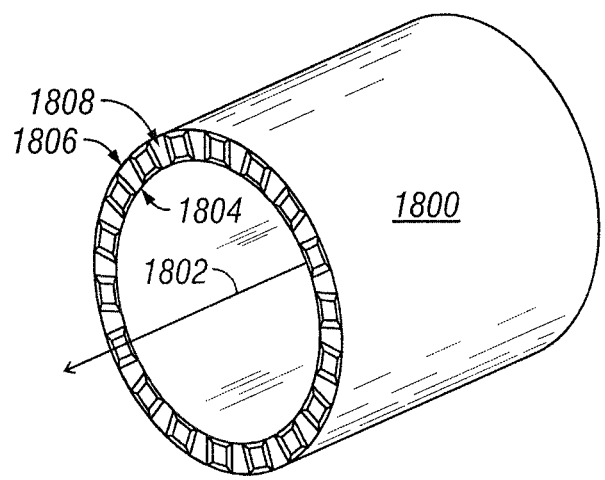
FIG. 18 is a cross-sectional view of an exemplary exhaust nozzle according to one embodiment of the present invention.

FIG. 18 is a cross sectional view of an exemplary exhaust nozzle 1800 implemented with a honeycomb structure 1808 according to one embodiment of the present invention. The exhaust nozzle 1800 is adapted to discharge an exhaust flow 1802 toward the distal end of the exhaust nozzle 1800. Note that even though the exhaust nozzle 1800 in FIG. 18 is depicted as being substantially cylindrical, the exhaust nozzle may take on a plurality of shapes, configurations, and/or geometries according to embodiments of the present invention. In some embodiments, for example, the exhaust nozzle comprises polygonal configurations thus enabling the utilization of flat segments of the honeycomb structure 1808 along with its surrounding layers (1804/1806).

The exhaust nozzle 1800 comprises a honeycomb structure 1808 adapted to dissipate heat and therefore mitigate or eliminate the effects of thermal deformation. When the exhaust flow 1802 heats the inner surface 1804 of the exhaust nozzle 1800, the honeycomb structure 1808 enables heat to be transferred to the outer surface 1806 thereby reducing the thermal gradient. In this manner, thermal deformation can be significantly reduced.

The honeycomb structure described above may also be used to implement one or more surfaces of an exhaust plug according to embodiments of the present invention.

Figure 19:
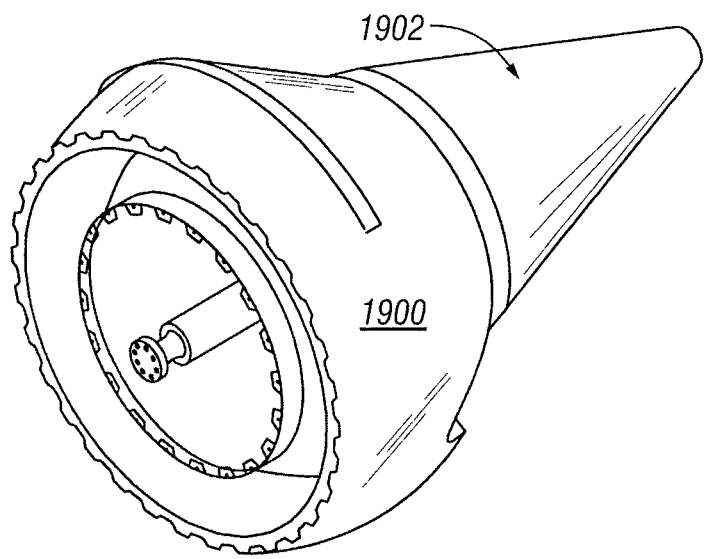
FIG. 19 is a perspective view of an exhaust system comprising an exhaust plug as known in the prior art.

FIG. 19 is a perspective view of an exhaust system 1900 comprising an exhaust plug 1902 as known in the prior art. The exhaust plug 2903 is typically mounted in the exhaust section of an engine where the primary air and core air are exhausted to produce thrust in a conventional manner.

Without adequate thermal conductivity, heat may build within the inner surface of the exhaust plug 1902 and cause stretching, tearing, and/or thermal deformation of the supporting materials. Some embodiments of the present invention therefore increase the thermal conductivity of the internal structure of the exhaust plug 1902.

Figure 20:
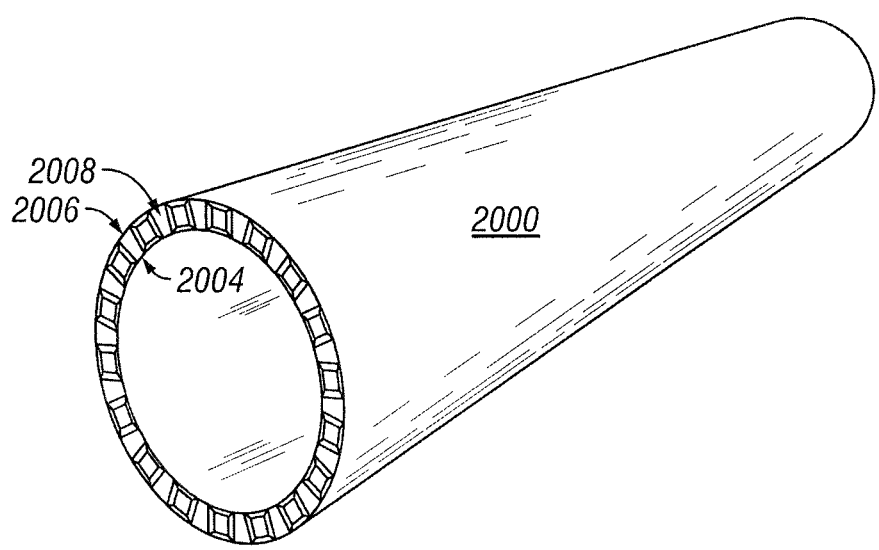
FIG. 20 is a cross-sectional view of an exhaust plug comprising a honeycomb structure according to one embodiment of the present invention.

FIG. 20 is a cross-sectional view of an exhaust plug 2000 comprising a honeycomb structure 2008 according to one embodiment of the present invention. The exhaust plug comprises an inner surface 2004 and an outer surface 2006, where each surface is bonded to a honeycomb core 2008. The honeycomb core enables heat to transfer from a surface having a relatively higher temperature to a surface having a relatively lower temperature. This heat transfer diminishes the temperature difference between the surfaces, thereby reducing thermal deformation.

Note that while the exhaust plug depicted in FIG. 20 is substantially conical in shape, myriad other geometries are also possible in accordance with the scope of the present invention. Additionally, the inner surface 2004 and the outer surface 2006 may comprise the same or different materials.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A honeycomb structure in an engine comprising a first region with an engine-core exhaust stream having a temperature greater than 1100° F. and a second region cooler than the first region, the honeycomb structure comprising:
   a plurality of cells, defined by a plurality of cell walls bonded to a first surface of the first region and a second surface of the second region, wherein each of the cell walls comprises:
      a first sheet of a first material; and a second sheet of a second material, wherein the second sheet is bonded to the first sheet, and wherein the second material has a higher thermal conductivity than the first material and conducts heat from the exhaust stream to the second region, wherein the first material comprises a material from the group consisting of: a metal, a high strength metal, Inconel, Inconel-625, and stainless steel.

2. The honeycomb structure of claim 1, wherein the second material comprises copper.

3. The honeycomb structure of claim 1, wherein the first sheet is approximately 0.002 inches thick.

4. The honeycomb structure of claim 1, wherein the second sheet is thicker than the first sheet.

5. The honeycomb structure of claim 1, wherein each of the cell walls further comprises a third sheet of a third material, wherein the third sheet is bonded to the second sheet.

6. The honeycomb structure of claim 5, wherein the third material comprises a material from the group consisting of: a metal, a high strength metal, Inconel, Inconel-625, and stainless steel.

7. The honeycomb structure of claim 5, wherein the third sheet is approximately 0.002 inches thick.

8. The honeycomb structure of claim 1, wherein the honeycomb structure is disposed within a thermally conductive chevron.

9. The honeycomb structure of claim 1, wherein the honeycomb structure is disposed within a sound baffle.

10. The honeycomb structure of claim 1, wherein the honeycomb structure is disposed within an exhaust nozzle assembly.

11. The honeycomb structure of claim 1, wherein the honeycomb structure is disposed within an exhaust plug assembly.

12. The honeycomb structure of claim 1, wherein the honeycomb structure is disposed within a thermally conductive flap.

13. A honeycomb structure in an engine comprising a first region with an engine-core exhaust stream having a temperature greater than 1100° F. and a second region cooler than the first region, the honeycomb structure comprising:
   a plurality of cells, defined by a plurality of cell walls, wherein each of the cell walls comprises:
      a first sheet of a first material;
      a second sheet of a second material; and
      a core sheet of a third material bonded to and positioned between the first and second sheets, wherein the third material has a higher thermal conductivity than the first material and the second material and conducts heat from the exhaust stream to the second region, wherein the first material comprises a material from the group consisting of: a metal, a high strength metal, Inconel, Inconel-625, and stainless steel.

14. The honeycomb structure of claim 13, wherein the second material comprises a material from the group consisting of: a metal, a high strength metal, Inconel, Inconel-625, and stainless steel.

15. The honeycomb structure of claim 13, wherein the third material comprises copper.

16. The honeycomb structure of claim 13, wherein the first material and the second material comprise the same material.

17. The honeycomb structure of claim 13, wherein the first material and the second material comprise different materials.

18. The honeycomb structure of claim 13, wherein the honeycomb structure is disposed within a chevron-shaped sound baffle.

19. The honeycomb structure of claim 13, wherein the honeycomb structure is disposed within an exhaust nozzle.

20. The honeycomb structure of claim 13, wherein the honeycomb structure is disposed within an exhaust plug.

21. The honeycomb structure of claim 13, wherein the honeycomb structure is disposed within a convergent flap.

22. The honeycomb structure of claim 13, wherein the honeycomb structure is disposed within a divergent flap.

23. A honeycomb structure in an engine comprising a first region with an engine-core exhaust stream having a temperature greater than 1100° F. and a second region cooler than the first region, the structure comprising:
   a plurality of cells, defined by a plurality of cell walls;
   a first surface of the first region perpendicular to each of the cell walls and bonded to a first end of the cell walls; and
   a second surface of the second region perpendicular to each of the cell walls and bonded to a second end of the cell walls,
   wherein each of the cell walls comprises a first layer adapted to conduct heat from the exhaust stream to the second surface and thereby reduce thermal deformation of the first surface, and a second layer attached to the first layer, wherein the second layer has a thermal conductivity that is different from that of the first layer, wherein the first layer comprises a material from the group consisting of: a metal, a high strength metal, Inconel, Inconel-625 and stainless steel.

24. The honeycomb structure of claim 23, wherein the structure is disposed within a thermally conductive chevron.

25. The honeycomb structure of claim 23, wherein the structure is disposed within an exhaust nozzle.

26. The honeycomb structure of claim 23, wherein the structure is disposed within an exhaust plug.

27. The honeycomb structure of claim 23, wherein the structure is disposed within a convergent/divergent flap assembly.

28. A method of producing a thermally conductive chevron configured for use in an engine comprising a first region with an engine-core exhaust stream having a temperature greater than 1100° F. and a second region cooler than the first region, the method comprising:
- forming a plurality of strips comprising a first layer and a second layer bonded to the first layer, wherein the second layer comprises a high-thermal conductivity material;
- forming a plurality of corrugated strips from the plurality of strips;
- forming a honeycomb structure from the plurality of corrugated strips, wherein the honeycomb structure comprises a plurality of cells being defined by a plurality of cell walls, each cell wall comprising the first and second layers, wherein the first layer comprises a material from the group consisting of: a metal, a high strength metal, Inconel, Inconel-625, and stainless steel;
- bonding a first surface to a first side of the honeycomb structure, the first surface configured for use in the first region; and
- bonding a second surface to a second side of the honeycomb structure, the second surface configured for use in the second region.

29. The method of claim 28, wherein at least one corrugation of the plurality of corrugated strips forms a half hexagon.

30. The method of claim 28, wherein the honeycomb structure comprises a plurality of hexagonal cells.

31. The method of claim 28, wherein the plurality of strips further comprises a third layer bonded to the second layer, wherein the second layer is positioned between the first layer and the third layer.

32. A method for utilizing a thermally conductive chevron, comprising:
- providing the thermally conductive chevron, wherein the thermally conductive chevron comprises:
  - a honeycomb structure comprising a plurality of cells formed from a plurality of cell walls;
  - a first surface perpendicular to the plurality of cell walls and bonded to a first end of the plurality of cell walls; and
  - a second surface perpendicular to the plurality of cell walls and bonded to a second end of the plurality of cell walls,
  - wherein each of the cell walls comprises a first layer adapted to transfer heat from the first surface to the second surface and thereby reduce thermal deformation of the first surface, and a second layer attached to the first layer, wherein the second layer has a thermal conductivity that is different from that of the first layer, wherein the first layer comprises a material from the group consisting of: a metal, a high strength metal, Inconel, Inconel-625, and stainless steel; and
- attaching the thermally conductive chevron to an engine, wherein the thermally conductive chevron separates a first region and a second region of the engine, wherein the first region comprises the first surface and an engine-core exhaust stream greater than 1100° F., and wherein the second region comprises the second surface.

33. The method of claim 32, further comprising operating the engine with the thermally conductive chevron attached to the engine to reduce a noise from the engine.

34. The method of claim 32, wherein said attaching the thermally conductive chevron to the engine comprises attaching the thermally conductive chevron to the exhaust nozzle of the engine.

35. The method of claim 32, wherein said attaching the thermally conductive chevron to the engine comprises attaching the thermally conductive chevron to a turbo-fan nacelle of the engine.

36. The method of claim 32, wherein the engine comprises a turbine engine.

* * * * *